United States Patent
Huang

(10) Patent No.: US 10,878,823 B2
(45) Date of Patent: Dec. 29, 2020

(54) VOICEPRINT RECOGNITION METHOD, DEVICE, TERMINAL APPARATUS AND STORAGE MEDIUM

(71) Applicant: PING AN TECHNOLOGY (SHENZHEN) CO., LTD., Guangdong (CN)

(72) Inventor: Jinlun Huang, Guangdong (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 16/626,320

(22) PCT Filed: Jul. 3, 2018

(86) PCT No.: PCT/CN2018/094374
§ 371 (c)(1),
(2) Date: Dec. 23, 2019

(87) PCT Pub. No.: WO2019/227583
PCT Pub. Date: Dec. 5, 2019

(65) Prior Publication Data
US 2020/0118571 A1 Apr. 16, 2020

(30) Foreign Application Priority Data
May 29, 2018 (CN) .......................... 2018 1 0528518

(51) Int. Cl.
*H04M 1/64* (2006.01)
*G10L 17/02* (2013.01)
(Continued)

(52) U.S. Cl.
CPC .............. *G10L 17/02* (2013.01); *G10L 17/04* (2013.01); *H04M 3/5175* (2013.01); *H04M 3/5233* (2013.01)

(58) Field of Classification Search
CPC ...... G10L 17/02; G10L 17/04; H04M 3/5175; H04M 3/5233
See application file for complete search history.

(56) References Cited

U.S. PATENT DOCUMENTS 7,454,399 B2 * 11/2008 Matichuk ............ G06F 9/45512
706/14
9,237,232 B1 * 1/2016 Williams ................ G10L 17/04
(Continued)

*Primary Examiner* — Simon King

(57) ABSTRACT

Provided are voiceprint recognition method, device, terminal apparatus and storage medium. The method comprises: allocating each agent to the corresponding group according to their calling authorities, collecting and processing voiceprint features of each agent in the group to obtain integrated voiceprint features of the group, building a dynamic voiceprint recognition model based on the grouping, calling authority and integrated voiceprint features, acquiring voice data of agent when a call operation from the agent is detected, performing voiceprint feature extraction, meanwhile determining the calling authority of the agent based on a dynamic voiceprint recognition model; if the calling authority of the to-be-identified agent does not meet the required customer level, executing a preset early warning processing measure, and further monitoring; judging the group to which the agent belongs through voiceprint recognition, and realizing real-time monitoring according to the corresponding relation between the group and the authority.

15 Claims, 6 Drawing Sheets

(51) Int. Cl.
    *G10L 17/04*    (2013.01)
    *H04M 3/51*    (2006.01)
    *H04M 3/523*    (2006.01)

(56) References Cited

U.S. PATENT DOCUMENTS

2013/0216029 A1* 8/2013 Pawlewski .......... H04M 3/2281
                                                      379/88.01
2014/0142944 A1* 5/2014 Ziv ..................... G10L 17/005
                                                      704/250
2014/0379340 A1* 12/2014 Timem ................. H04L 63/102
                                                      704/246
2017/0061968 A1* 3/2017 Dalmasso ............... G10L 17/08

* cited by examiner

Using the Levinson-Durbin algorithm to predict the linear prediction coefficient in the calculation formula (F1) of the prediction error of the target voice frame, and determining the target linear prediction coefficients $a'_1, a'_2, ..., a'_p$ according to the prediction results:

$$e(n) = s(n) - \hat{s}(n) = s(n) - \sum_{i=1}^{p} a_i s(n-i) \quad \text{F1}$$

wherein $e(n)$ is the prediction error, $\hat{s}(n)$ is a prediction value of the target voice frame sequence, $n$ is the total number of points contained in the target voice frame sequence, $s(n-i)$ is the sum of the values of the previous points $n-i$ of the target voice frame sequence, $a_i$ is the linear prediction coefficient of the point $i$ in the target voice frame sequence, p is the preset order of linear prediction, $i \in [1, p]$, $n$ is a positive integer — S251

Calculating a linear prediction cepstrum coefficient of the target voice frame by formula (F2) according to the target linear prediction coefficient, and taking the linear prediction cepstrum coefficient as the voiceprint feature:

$$\hat{h}(n) = \begin{cases} a'_1 & n = 1 \\ a'_n + \sum_{k=1}^{n-1}\left(1-\dfrac{k}{n}\right) a'_k \hat{h}(n-k) & 1 < n \leq p \\ \sum_{k=1}^{p}\left(1-\dfrac{k}{n}\right) a'_k \hat{h}(n-k) & n > p \end{cases} \quad \text{F2}$$

wherein, $\hat{h}(n)$ is the linear prediction cepstrum coefficient — S252

Fig. 4

For each basic voiceprint feature set, adopting genetic algorithm to optimize the voiceprint features in the basic voiceprint feature set, to obtain a codebook set corresponding to the basic voiceprint feature set — S31

For the xth basic voiceprint feature set, acquiring the total number q of codebooks in the codebook set corresponding to the basic voiceprint feature set, randomly selecting k codebooks in the codebook set as training samples, arithmetically averaging the codebook matrix of the training samples according to corresponding bits to obtain category codebooks $D_x$, taking the category codebooks $D_x$ as the integrated voiceprint features of the basic voiceprint feature set of xth group, wherein, $k \in [1, q]$, x and q are positive integers — S32

Fig. 5

VOICEPRINT RECOGNITION METHOD, DEVICE, TERMINAL APPARATUS AND STORAGE MEDIUM

The present application is based on, and claims priority from, Chinese invention patent application No. 201810528518.0, filed on May 29, 2018, entitled "Voiceprint Recognition Method, Device, Terminal Apparatus and Storage Medium".

TECHNICAL FIELD

The application relates to the technical field of computer communication, in particular to a voiceprint recognition method, device, terminal apparatus and storage medium.

BACKGROUND

The call center consists of an interactive voice response system and a manual telephone service system. The manual telephone service system consists of a check-in system, a phone service platform and an interface machine. In order to perform customer service, customer representatives, i.e., call agents, need to perform check-in operations in the check-in system. After successfully checking in the phone service platform, a call will be set up with the customer according to the manual service request assigned by the phone service platform, i.e., agents call out, so as to perform customer service. Usually, customers are divided into different levels of different services according to business requirements, and each agent arranges to receive customers of different levels and different services according to its responsibilities.

Although each agent has been informed of the corresponding call-out authority before calling out, in real practice there are often situations where some unskilled agents make out-calls to high-level customers.

In the prior art, generally after listening to the recording and analyzing the recording, the call-out information that does not conform to the authority is obtained and processed accordingly. In this case, the early warning is not timely, resulting in untimely monitoring of customer service voice calls and low monitoring efficiency.

SUMMARY

The embodiments of the application provide a voiceprint recognition method, device, terminal apparatus and storage medium, so as to solve the problems of untimely monitoring of customer service voice calls and low monitoring efficiency.

In a first aspect, an embodiment of the present application provides a voiceprint recognition method, comprising:

acquiring calling authority of each agent form database, and allocating each agent into a group corresponding to their calling authorities according to a preset authority grouping mode;

collecting voiceprint features of each agent in each group to obtain a basic voiceprint feature set of the group;

training the voiceprint features in each of the basic voiceprint feature sets to obtain integrated voiceprint features of each of the basic voiceprint feature sets, and building a dynamic voiceprint recognition model based on voiceprint correspondence relationships among the grouping, the calling authority and the integrated voiceprint features;

acquiring customer level of a called customer and voice data of a to-be-identified agent if a call operation from the to-be-identified agent is detected, and performing voiceprint feature extraction on the voice data to obtain target voiceprint features;

identifying the target voiceprint features and determining the calling authority of the to-be-identified agent based on the dynamic voiceprint recognition model;

executing a preset early warning processing measure if the calling authority of the to-be-identified agent does not meet required customer level.

In a second aspect, an embodiment of the present application provides a voiceprint recognition device, comprising:

an agent authority grouping module, configured for acquiring calling authority of each agent form database, and allocating each agent into a group corresponding to their calling authorities according to a preset authority grouping mode;

a voiceprint feature acquisition module, configured for collecting voiceprint features of each agent in each group to obtain a basic voiceprint feature set of the group;

an identification model building module, configured for training the voiceprint features in each of the basic voiceprint feature sets to obtain integrated voiceprint features of each of the basic voiceprint feature sets, and building a dynamic voiceprint recognition model based on voiceprint correspondence relationships among the grouping, the calling authority and the integrated voiceprint features;

a target feature acquisition module, configured for acquiring customer level of a called customer and voice data of a to-be-identified agent if a call operation from the to-be-identified agent is detected, then and performing voiceprint feature extraction on the voice data to obtain target voiceprint features;

a calling authority determining module, configured for identifying the target voiceprint features and determining the calling authority of the to-be-identified agent based on the dynamic voiceprint recognition model;

a real-time voice early warning module, configured for executing a preset early warning processing measure if the calling authority of the to-be-identified agent does not meet required customer level.

In a third aspect, the embodiment of the present application provides a terminal apparatus, comprising a memory, a processor, and computer readable instructions stored in the memory and executed by the processor, wherein the processor performs the steps of the voiceprint recognition method when executing the computer readable instructions.

In a fourth aspect, the embodiment of the present application provides one or more nonvolatile readable storage medium storing computer readable instructions, wherein when the computer readable instructions are executed by one or more processors, the one or more processors perform steps of the voiceprint recognition method.

Details of one or more embodiments of the present application are set forth in the following drawings and description, and other features and advantages of the present application will become apparent from the description, drawings, and claims.

BRIEF DESCRIPTION OF DRAWINGS

In order to more clearly explain the technical solution of the embodiments of this application, the following will briefly describe the drawings of the embodiments of this application. Obviously, the drawings in the following description are only some embodiments of this application.

For those skilled in the art, other drawings can be obtained according to these drawings without the exercise of inventive faculty.

FIG. 4 is a flowchart of the implementation of step S25 for the voiceprint recognition method provided in embodiment 1 of this application;

FIG. 5 is a flowchart of the implementation of step S3 for the voiceprint recognition method provided in embodiment 1 of this application;

DETAILED DESCRIPTION OF DISCLOSED EMBODIMENTS

In the following, the technical solution in the embodiments of the application will be described clearly and completely with reference to the drawings in the embodiments of the application. Obviously, the described embodiments are parts of the embodiments of the application, not all of the embodiments. Based on the embodiments in this application, all other embodiments obtained by those of ordinary skill in the art without the exercise of inventive faculty are within the scope of protection.

Embodiment 1

Figure 1:
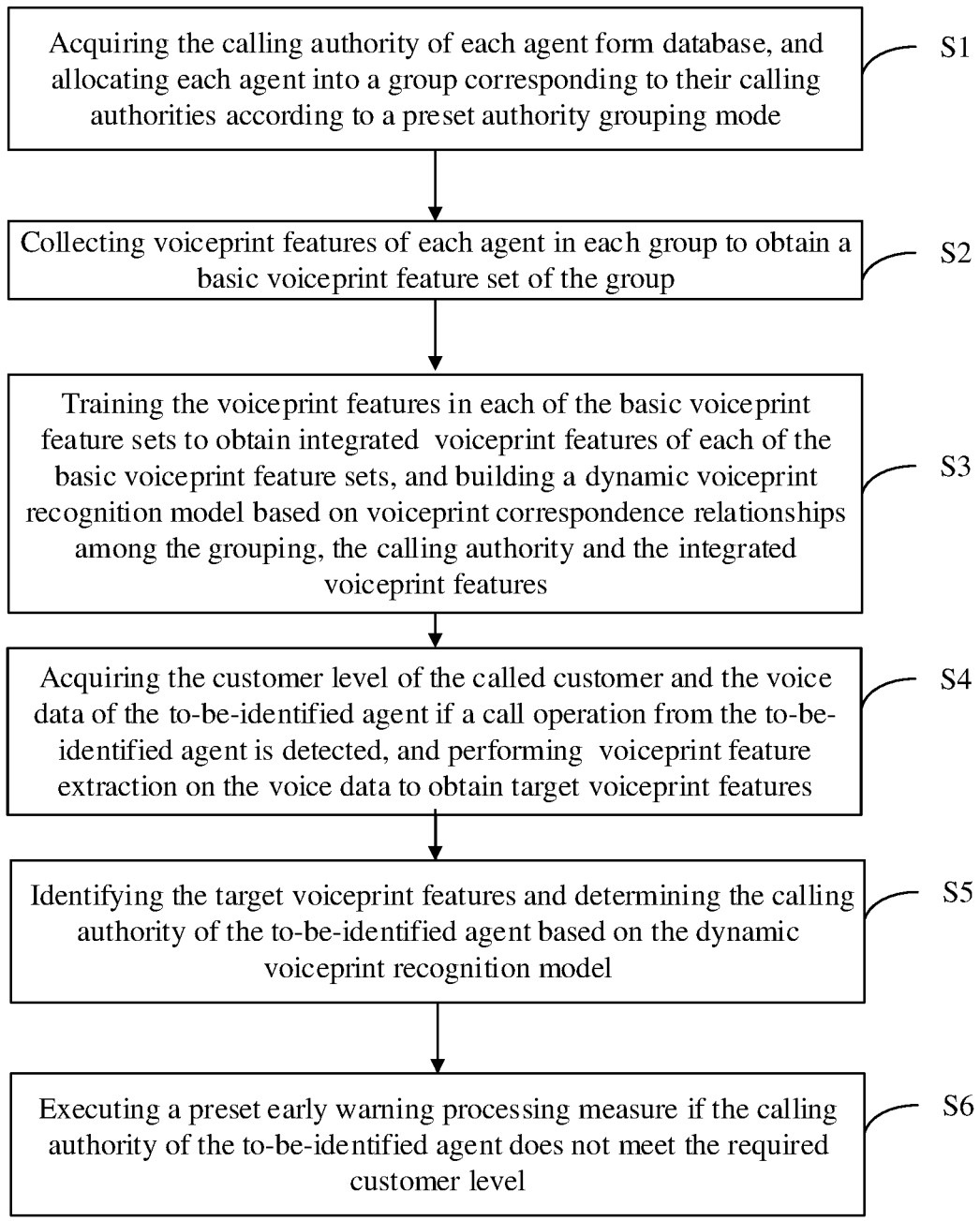
FIG. 1 is a flowchart of the implementation for the voiceprint recognition method provided in embodiment 1 of this application.

Referring to FIG. 1, which shows the implementation flow of the voiceprint recognition method provided in embodiment 1 of this application; The voiceprint identification method is applied to an agent call-out scene of a call center, and the call center comprises a server end and a client end, wherein the server end and the client end are connected through a network, and agents make out-calls through the client end, the client can be, but is not limited to, various personal computers, notebook computers, smart phones, tablet computers and portable wearable devices, and the server end can specifically be an independent server or a server cluster composed of multiple servers. The voiceprint recognition method provided by the embodiment of the application is applied to the server end and is described in detail as follows:

S1: acquiring calling authority of each agent form database, and allocating each agent into a group corresponding to their calling authorities according to a preset authority grouping mode.

Specifically, the calling authority of each agent is stored in the database, and each agent is assigned to the group corresponding to its calling authority.

For example, in a specific embodiment, there are 6 levels of calling authority stored in the database, namely, $R_1$, $R_2$, $R_3$, $R_4$, $R_5$ and $R_6$, and a total of 3,000 agents. These agents are assigned to 6 groups with different authority levels according to their corresponding authorities to obtain the following authority level groups (from high to low): Group 1 (10 people) the corresponding authority is $R_1$; Group 2 (80 people), the corresponding authority is $R_2$; Group 3 (200 people), the corresponding authority is $R_3$; Group 4 (600 people), the corresponding authority is $R_4$; Group 5 (1800 people), the corresponding authority is $R_5$; Group 6 (310 people), the corresponding authority is $R_6$.

It should be noted that high-level authorities include low-level authorities. For example, agents belonging to Group 1 have all calling authorities, while agents belonging to Group 6 have the least calling authorities, i.e. $R_6 \subset R_5 \subset R_4 \subset R_3 \subset R_2 \subset R_1$.

S2: collecting voiceprint features of each agent in each group to obtain a basic voiceprint feature set of the group.

Specifically, voiceprint feature collection is respectively carried out on agents in the same group, and voiceprint features of all agents in the same group are taken as the basic voiceprint feature set of the group.

Among them, voiceprint features include but are not limited to acoustic features, lexical features, prosodic features, dialect language and accent information, as well as channel information.

Preferably, the voiceprint features adopted in this application are acoustic features.

S3: training the voiceprint features in each of the basic voiceprint feature sets to obtain integrated voiceprint features of each of the basic voiceprint feature sets, and building a dynamic voiceprint recognition model based on voiceprint correspondence relationships among the grouping, the calling authority and the integrated voiceprint features.

Specifically, training the voiceprint features in each of the basic voiceprint feature sets to obtain integrated voiceprint features of each of the basic voiceprint feature sets, i.e., the integrated voiceprint features of the group, and building a dynamic voiceprint recognition model based on the corresponding relationship among the grouping, the calling authority and the corresponding relationship between grouping and voiceprint features provided in steps S1 and S2.

Wherein, the voiceprint features in each basic voiceprint feature set are trained to obtain the integrated voiceprint features of each basic voiceprint feature set. The training methods adopted include but are not limited to: template matching method, nearest neighbor method, neural network method, Hidden Markov Model (HMM), Vector Quantization (VQ) method, multiple-term formula, Polynomial Classifiers method, etc.

Preferably, the training method adopted in the embodiment of the present application is an improved algorithm of the Genetic Algorithm based on the neural network method. By taking each group as a community and the voiceprint feature of each agent in the group as a chromosome, the genetic algorithm is used to perform initialization coding, individual evaluation, selection, crossover and mutation, and then the optimal solution or approximate solution of the group, i.e., the integrated voiceprint feature of the group, is obtained.

S4: acquiring customer level of a called customer and voice data of a to-be-identified agent if a call operation from the to-be-identified agent is detected, and performing voiceprint feature extraction on the voice data to obtain target voiceprint features.

Specifically, when the calling operation of the to-be-identified agent is detected, the identification information is searched in the customer database according to the customer identification information of the called customer to obtain the customer level of the called customer.

The customer level is preset and stored in the customer database, and there is a mapping relationship between the customer level and the calling authority level.

Taking the 6 levels of calling authorities stored in step S1 as an example, the customer level in the customer database is divided into 10 levels (1 to 10), and the corresponding calling authorities of the 6 groups are: agents in Group 1 can call customers of level 1 to level 10, agents in Group 2 can call customers of level 3 to 10 levels, agents in Group 3 can call customers of level 4 to level 10, agents in Group 4 can call customers of level 5 to level 10, agents in Group 5 can call customers of level 7 to level 10, and agents in Group 6 can call customers of level 9 to 10.

Further, acquiring voice data of the to-be-identified agents, extracting voiceprint features on the voice data to obtain target voiceprint features of the agents. For the extraction method, refer to the description of steps S22 to S25 below. To avoid repetition, it will not be repeated here.

S5: identifying the target voiceprint features and determining the calling authority of the to-be-identified agent based on the dynamic voiceprint recognition model;

Specifically, the group corresponding to the target voiceprint feature is determined by inputting the target voiceprint feature into a dynamic voiceprint recognition model for recognition, and thereby the calling authority corresponding the group is found, which is the calling authority of the to-be-identified agent.

S6: executing the preset early warning processing measure if the calling authority of the to-be-identified agent does not meet required customer level.

Specifically, according to the relationship between the customer level corresponding to the calling authority of the to-be-identified agent R and the customer level of the called customer, whether the current call meets the requirement is determined. If r⊂R, it is considered that the calling authority of the to-be-identified agent does not meet the customer level requirements of the called customer, the preset processing measures will be executed, and the information of the current call will be sent to the monitoring personnel, the violation call record will be recorded.

Taking the 10 customer levels corresponding to the 6 levels of calling authority groups in step S4 as an example, the obtained group to which the to-be-identified agent belongs is Group 5, and the corresponding calling authority is $R_5$, i.e. the customer levels to be called are levels 7-10. If the customer level of the current called customer is any level from level 7 to level 10, then the current call meets the requirement. If the customer level of the current called customer is any level from level 1 to level 6, it is considered that the calling authority of the to-be-identified agent does not meet the customer level requirements of the called customer, and corresponding early warning measures will be taken.

Wherein, the preset processing measures include, but are not limited to, sending reminders to the to-be-identified agents, pushing warning message to the monitoring center, forcing call forwarding and forcing hang-up, etc., depending on the actual situation, and not limited herein.

In the embodiment corresponding to FIG. 1, on the one hand, by acquiring the calling authority of each agent from database, and according to a preset authority grouping mode, each agent is allocated to a group corresponding to their calling authorities. For each group, voiceprint feature collection is carried out on each agent of the group to obtain a basic voiceprint feature set of the group, and voiceprint features in each basic voiceprint feature set are trained to obtain integrated voiceprint features of each basic voiceprint feature set. The dynamic voiceprint recognition model is constructed based on the corresponding relation among grouping, calling authority and the integrated voiceprint features. This method for extracting the integrated voiceprint features of each group by grouping can quickly determine the group to which the current voice data belongs when a call operation is detected, thus improving the recognition efficiency, further realizing timely monitoring and improving the monitoring efficiency. On the other hand, when the call operation of a to-be-identified agent is detected, the customer level of the called customer and the voice data of the to-be-identified agent are obtained, and the voice data is subjected to voiceprint feature extraction to obtain a target voiceprint feature; meanwhile, based on the dynamic voiceprint recognition model, the target voiceprint feature is recognized to determine the calling authority of the to-be-identified agent; if the calling authority of the to-be-identified does not meet the requirements of the customer level, a preset early warning processing measure is executed. By using the voiceprint recognition method, the calling authority of the agent can be determined, and then whether the current call of the agent meets requirement or not is determined. If it does not meet, early warning measures can be taken in time to realize real-time monitoring, and effectively improve the real-time monitoring and the calling quality of the agent call.

Next, on the basis of the embodiment corresponding to FIG. 1, the specific implementation method of step S2 of "collecting voiceprint features of each agent in each group to obtain a basic voiceprint feature set of the group" will be described in detail through a specific embodiment.

Figure 2:
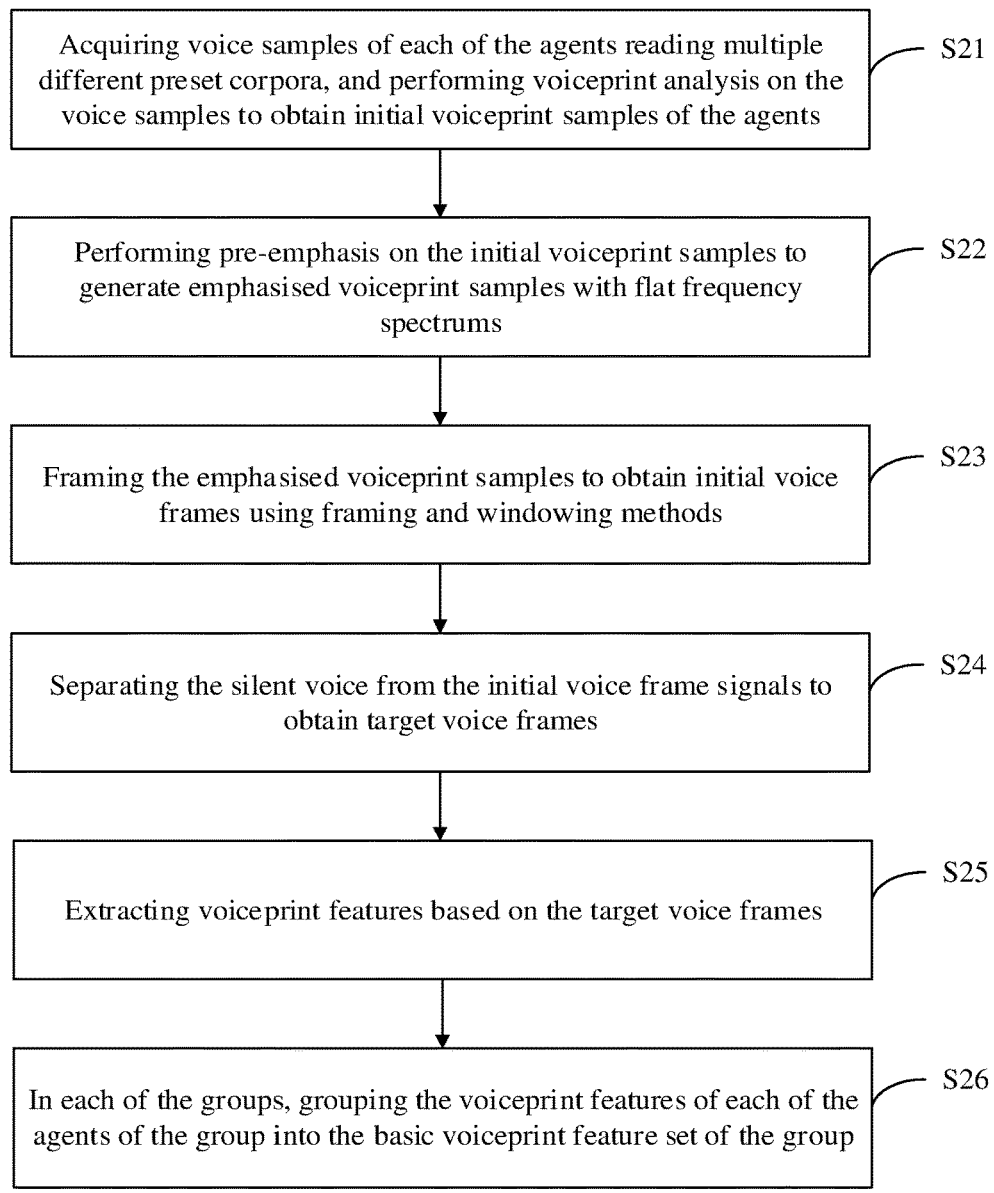
FIG. 2 is a flowchart of step S2 of the voiceprint recognition method provided in embodiment 1 of this application.

Refer to FIG. 2, which shows the specific implementation flow of step S2 provided by the embodiment of the present application, and details are as follows:

S21: acquiring voice samples of each of the agents reading multiple different preset corpora, and performing voiceprint analysis on the voice samples to obtain initial voiceprint samples of the agents.

Specifically, preset corpora with different contents are provided for each agent to read aloud and record to obtain a recording sample, and then voice signal extraction is carried out on the recording samples to further obtain the initial voiceprint samples of the agents.

For example, in a specific embodiment, there are three corpora provided to a certain agent, namely, Corpus 1, Corpus 2 and Corpus 3. The agent reads the three corpora five times each, and then 15 recorded texts are obtained. The 15 recorded texts are subjected to voice signal extraction to obtain 15 segments of voice signals, and the 15 segments of voice signals are taken as the initial voiceprint samples of the agents.

Wherein, corpora refer to large-scale language examples that cannot be observed in statistical natural language processing.

Preferably, the recording duration of each recording sample is 30 seconds.

S22: performing pre-emphasis on the initial voiceprint samples to generate emphasised voiceprint samples with flat frequency spectrums;

Specifically, glottal excitation and oronasal radiation will affect the average power spectrum of the voice signal, causing the high frequency to drop by 6 dB/octave when it exceeds 800 Hz. Therefore, when calculating the frequency spectrum of the voice signal, the higher the frequency, the smaller the corresponding component. Therefore, pre-emphasis processing should be performed in preprocessing. The purpose of pre-emphasis is to improve the high-frequency part, flatten the frequency spectrum of the signal, maintain the frequency spectrum in the whole frequency band from low to high frequency, and the spectrum can be obtained with the same signal-to-noise ratio so as to facilitate spectrum analysis or channel parameter analysis. Pre-emphasis can be performed before the anti-aliasing filter when the speech signal is digitized, thus not only pre-emphasis can be performed, but also the dynamic range of the signal can be compressed, and the signal-to-noise ratio can be effectively improved. Pre-emphasis can be implemented using a first-order digital filter, such as Finite Impulse Response (FIR) filter.

It is worth noting that the voice signals acquired by device are all analog signals. Before pre-emphasis processing is carried out on these analog signals, the analog signals need to be converted into digital signals through sampling and quantization. According to the spectrum range of voice of 200-3400 Hz, the sampling rate can be set to 8 KHz and the quantization accuracy is 16 bits.

It should be understood that the numerical ranges of sampling rate and quantization accuracy herein are the preferred ranges of this application, but they can be set according to the needs of practical applications and are not limited here.

After the voice signal is pre-emphasized, the high-frequency part of the frequency spectrum is improved, and the signal becomes flat, thus generating emphasised voiceprint samples with flat frequency spectrums, which is beneficial to subsequent voiceprint feature extraction.

Figure 3:
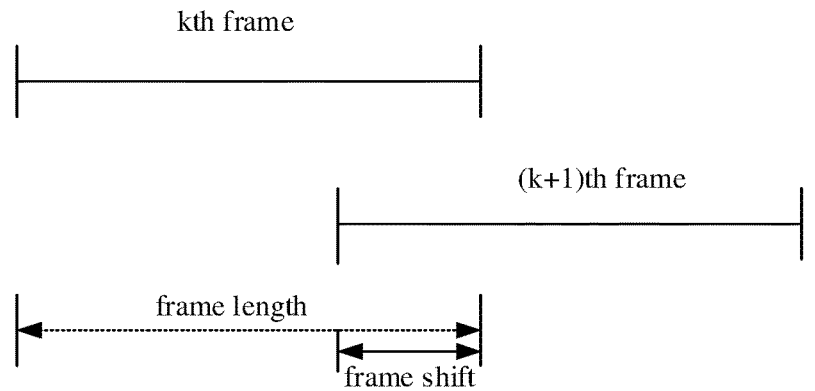
FIG. 3 is an example diagram of voice signal overlapping framing for the voiceprint recognition method provided in embodiment 1 of the present application.

S23: framing the emphasised voiceprint samples to obtain initial voice frames using framing and windowing methods;

Specifically, voice signals have the property of short-term stability. After pre-emphasis processing, voice signals need to be framed and windowed to maintain the short-term stability of signals. In general, the number of frames per second is 33-100. In order to maintain the continuity between frames and enable smooth transition between two adjacent frames. Overlapping framing is adopted, as shown in FIG. 3, which shows an example of overlapping framing, the overlapping part between the kth frame and the (k+1)th frame in FIG. 3 is frame shift.

Preferably, the value range of the ratio of frame shift to frame length is (0, 0.5).

For example, in a specific embodiment, the pre-emphasised voice signal is s'(n), the frame length is N sampling points, and the frame shift is M sampling points. When the sampling point corresponding to the L-th frame is the nth, the corresponding relation between the original voice signal $x_l(n)$ and each parameter is:

$$x_l(n)=x[(l-1)M+n]$$

Wherein, n=0,1, ..., N−1, N=256.

Further, after the voiceprint samples are framed, the corresponding window function w(n) is adopted to multiply the pre-emphasized voice signal s'(n) to obtain the windowed voice signal $S_w$, which is used as the initial voice frame signal.

Wherein, the window function includes but is not limited to Rectangular window, Hamming window, Hanning window, etc.

The rectangular window expression is:

$$w(n) = \begin{cases} 1 & (0 \le n \le N-1) \\ 0 & (n < 0, n > N) \end{cases}$$

The hamming window expression is:

$$w(n) = \begin{cases} 0.54 - 0.46\cos(2*pi*n/(N-1)) & (0 \le n \le N-1) \\ 0 & (n < 0, n > N) \end{cases}$$

The hanning window expression is:

$$w(n) = \begin{cases} 0.5(1 - \cos(2*pi*n/(N-1))) & (0 \le n \le N-1) \\ 0 & (n < 0, n > N) \end{cases}$$

The pre-emphasized voiceprint samples are framed and windowed, so that the voiceprint samples keep the continuity between frames, and some abnormal signal points are eliminated, thus improving the robustness of the voiceprint samples.

S24: separating silent voice from the initial voice frames to obtain target voice frames;

Specifically, during the duration of the call, the voice signal can be divided into two states: an active period and a silent period. No voice signal is transmitted during silence period, and the active period and the silent period of the uplink and downlink are independent of each other. In step S21, during the recording process, user will pause before and after each reading, which is the pause of voice signal, i.e. the silence period. During the voiceprint feature extraction, the silence period state needs to be detected, and then the silence period and active period are separated to obtain a continuous active period, and the remaining voice signal of the continuous active period is taken as the target voice frame.

Wherein, the ways to detect the silence state include, but are not limited to, voice endpoint detection, FFMPEG detection audio silence algorithm and voice activity detection (VAD) algorithm, etc.

S25: extracting voiceprint features based on the target voice frames;

Specifically, after pre-emphasis, framing, windowing and silence separation, a stable voiceprint sample is obtained, and the sample is used for voiceprint feature extraction.

Wherein, voiceprint feature extraction is to extract and select acoustic or linguistic features with strong separability and high stability of speaker's voiceprint.

Preferably, the extracted voiceprint features selected in this application are linear cepstrum features of acoustic features.

S26: in each of the groups, grouping the voiceprint features of each of the agents of the group into the basic voiceprint feature set of the group.

Specifically, after obtaining the voiceprint features of each agent in step S25, the voiceprint features of the agents in each group are grouped into a voiceprint feature set for subsequent construction of a dynamic voiceprint recognition model.

In the embodiment corresponding to FIG. 2, for each agent in each group, obtaining a recording sample of the agent reading aloud a preset plurality of corpora, analyzing the voiceprint of the recording sample to obtain an initial voiceprint sample of the agent, and performing pre-emphasis on the initial voiceprint sample to generate a pre-emphasized voiceprint sample with a flat frequency spectrum, the method of framing and windowing is adopted to frame the pre-emphasized voiceprint sample to obtain an initial voice frame with robustness, then the initial voice frame signal is subjected to silent sound separation to filter out interfering silent sounds to obtain a target voice frame, so that the voiceprint sample has continuity and robustness, and then the voiceprint features of agent are extracted from the voiceprint sample, in each group, the voiceprint features of each agent in the group are grouped into a basic voiceprint feature set of the group, so that the accuracy and robustness of voiceprint features in the basic voiceprint feature set are improved.

On the basis of the embodiment of FIG. 2, a specific implementation method for extracting voiceprint features based on the target speech frame mentioned in step S25 will be described in detail below through a specific embodiment:

Refer to FIG. 4, which shows the specific implementation flow of step S25 provided by the embodiment of the present application, and details are as follows:

S251: using Levinson-Durbin algorithm to predict linear prediction coefficient in calculation formula (F1) of prediction error of the target voice frame, and determining target linear prediction coefficients $a'_1, a'_2, \ldots, a'_p$ prediction results:

$$e(n) = s(n) - \hat{s}(n) = s(n) - \sum_{i=1}^{p} a_i s(n-i) \qquad F1$$

wherein e(n) is the prediction error, ŝ(n) is a prediction value of a target voice frame sequence, n is the total number of points contained in the target voice frame sequence, s(n−i) is sum of the values of previous points n−i of the target voice frame sequence, $a_i$ is the linear prediction coefficient of the point i in the target voice frame sequence, p is preset order of linear prediction, i∈[1, p], n is a positive integer.

Specifically, due to the correlation between adjacent sampling points of voice, linear prediction can be used to predict the present or future sampling points according to the past sampling points, i.e. several past voice samples or their linear combinations are used to approximate the present sample value of the voice. The purpose of prediction is to find a set of suitable coefficients so as to minimize the mean square value of prediction error e(n). Generally, in the actual prediction process, the sampling sequence is divided into frames according to a certain number, and then prediction is carried out frame by frame, and P best prediction coefficients of the frame are found. The accuracy of prediction is not measured by the prediction results of a single sampling point, but by the overall effect of intra-frame prediction of various single samplings.

In the embodiments of the present application, the present or future sampling points of the signal are predicted by using the past P sampling points of the signal to obtain a predicted value. Assuming that the sequence of voice signals is s(n), n is any positive integer of [1,n], s(n) is the value of point n at the current time, the predicted value is ŝ(n), and then the difference between the predicted value and the real value is taken as the prediction error of the point.

Further, in order to make the prediction accurate, it is necessary to reduce the prediction error. In this application, the mean square error derivation is adopted to the prediction error to obtain the Yule-Walker Equation, and the Yule-Walker equation is solved using the levinson-Debin algorithm. The obtained set of linear prediction coefficients is the linear prediction coefficient that minimizes the prediction error value, and the linear prediction coefficients are taken as the target prediction coefficients.

S252: calculating a linear prediction cepstrum coefficient of the target voice frame by formula (F2) according to the target linear prediction coefficient, and taking the linear prediction cepstrum coefficient as the voiceprint feature:

$$\hat{h}(n) = \begin{cases} a'_1 & n=1 \\ a'_n + \sum_{k=1}^{n-1}\left(1-\frac{k}{n}\right)a'_k \hat{h}(n-k) & 1 < n \le p \\ \sum_{k=1}^{p}\left(1-\frac{k}{n}\right)a'_k \hat{h}(n-k) & n > p \end{cases} \qquad F2$$

wherein is the linear prediction cepstrum coefficient.

Specifically, the formula (F2) is used to calculate the corresponding linear prediction cepstrum coefficient according to the value range of n, and the obtained linear prediction cepstrum coefficient is taken as the voiceprint feature of the voice signal sequence s(n).

In the embodiment corresponding to FIG. 4, the expression of the prediction error of the target voice frame is used to obtain the extreme value, and the set of linear prediction coefficients that minimize the prediction error are found and taken as the target linear prediction coefficients. The target linear prediction coefficients are used to calculate the linear prediction cepstrum coefficients through the formula (F3), and the linear cepstrum coefficients are used as voiceprint features, so that the collected voiceprint features have higher accuracy, which is conducive to improving the prediction accuracy of the dynamic voiceprint recognition model.

On the basis of the embodiment corresponding to FIG. 1, the specific implementation method of "training the voiceprint features in each of the basic voiceprint feature sets to obtain integrated voiceprint features of each of the basic voiceprint feature set" mentioned in step S3 will be described in detail below through a specific embodiment.

Refer to FIG. 5, which shows the specific implementation flow of step S3 provided by the embodiment of the present application, and details are as follows:

S31: for each basic voiceprint feature set, adopting genetic algorithm to optimize the voiceprint features in the basic voiceprint feature set, to obtain a codebook set corresponding to the basic voiceprint feature set;

Specifically, refer to the description in step S3 for the specific process of optimizing voiceprint features in the basic voiceprint feature set by using genetic algorithm. In order to avoid repetition, it is not repeated here.

S32: for the xth basic voiceprint feature set, acquiring the total number q of codebooks in the codebook set corresponding to the basic voiceprint feature set, randomly selecting k codebooks in the codebook set as training samples, arithmetically averaging codebook matrix of the training samples according to corresponding bits to obtain category codebooks $D_x$, taking the category codebooks $D_x$ as the integrated voiceprint features of basic voiceprint feature set of the xth group, wherein k∈[1, q], x and q are positive integers.

It can be understood that for the basic voiceprint set of each group, the integrated voiceprint characteristics of the group are obtained. In the embodiment of this application, the category codebook is obtained by taking arithmetic mean according to corresponding bits. In other embodiments, the category codebook can also be obtained by selecting weighted mean, geometric mean, square mean, harmonic mean, etc, according to the actual situation, and there is no specific limitation here.

It is worth noting that after generating the category codebook, the distance from each voiceprint feature to the category codebook in the group is calculated using the formula (F3) in the following step S52, and these distances are compared with the preset distance. If the number of voiceprint features greater than the preset distance exceeds the preset threshold, it is determined that the category codebook does not meet the requirements, and k codebooks are randomly selected for retraining until when comparing the Euclidean distance between the generated category codebook and each voiceprint in the group, the number greater than the preset distance does not exceed the preset threshold, then the category codebook at this time is taken as the category codebook of the group.

In the embodiment corresponding to FIG. 5, for each basic voiceprint feature set, a genetic algorithm is adopted to optimize voiceprint features in the basic voiceprint feature set to obtain a codebook set corresponding to the basic voiceprint feature set, the total number of codebooks in the codebook set corresponding to the basic voiceprint feature set is obtained in each basic voiceprint feature set, and a preset number of codebooks are randomly selected in the codebook set as training samples. The codebook matrix of the training samples is arithmetically averaged according to corresponding bits to obtain category codebooks, and the category codebooks of all groups are obtained according to the method. By extracting the integrated voiceprint features of each group, the group to which the current voice data belongs can be quickly judged when a call operation is detected, so the recognition efficiency is improved.

On the basis of the embodiment corresponding to FIG. 5, the following is a detailed description of the specific implementation method of "identifying the target voiceprint features and determining the calling authority of the to-be-identified agent based on the dynamic voiceprint recognition model" mentioned in step S5 through a specific embodiment.

Figure 6:
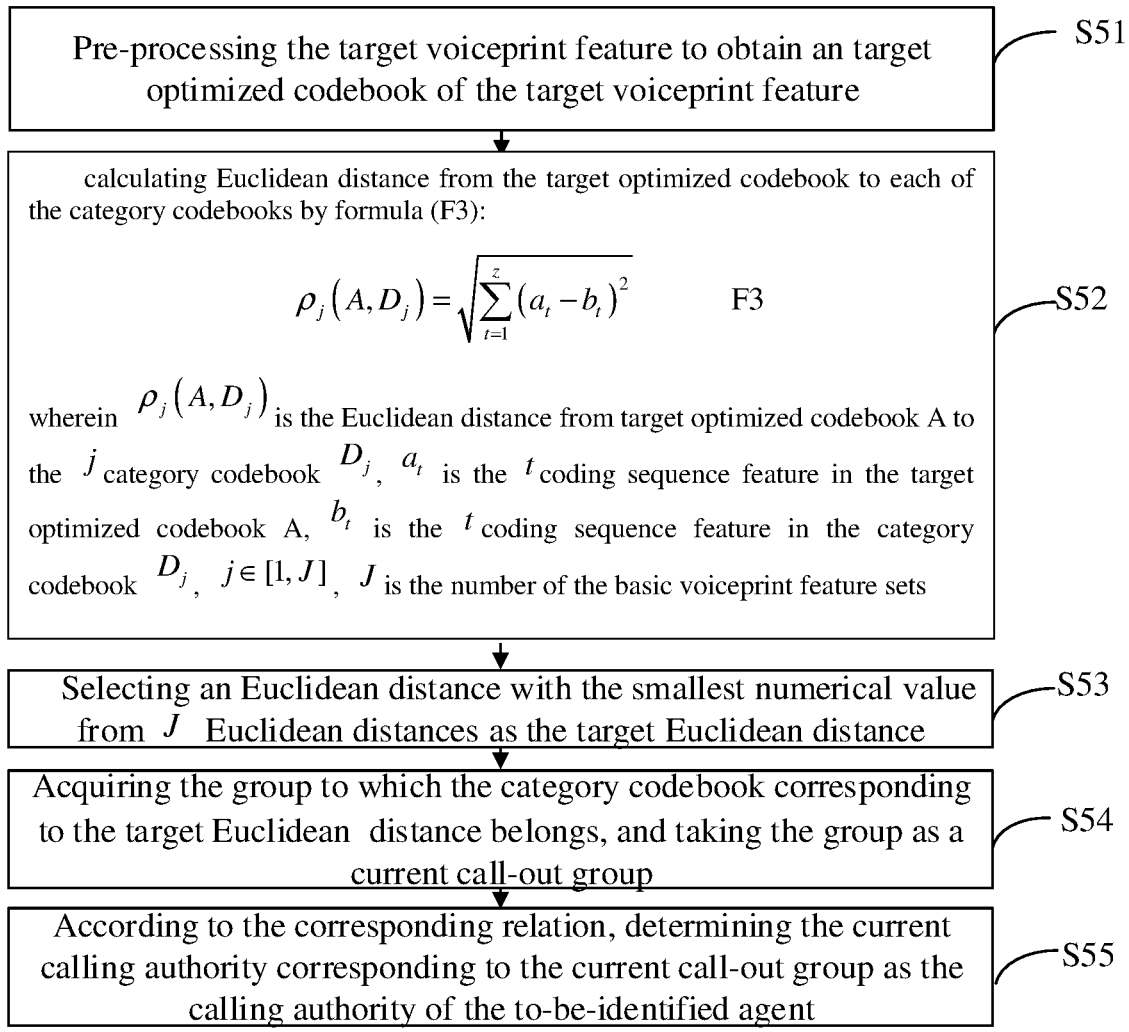
FIG. 6 is a flowchart of the implementation of step S5 for the voiceprint recognition method provided in embodiment 1 of this application.

Refer to FIG. 6, which shows the specific implementation flow of step S5 provided by the embodiment of the present application, and details are as follows:

S51: pre-processing the target voiceprint feature to obtain a target optimized codebook of the target voiceprint feature;

Specifically, the target voiceprint features obtained in step S4 are preprocessed. The preprocessing process can refer to the descriptions in steps S22 to S25, and then the voiceprint features in the basic voiceprint feature set are optimized by genetic algorithm to obtain the target optimization codebook of the target voiceprint features. For the specific optimization process, please refer to the description in step S3. In order to avoid repetition, no more details are given here.

S52: calculating Euclidean distance from the target optimized codebook to each of the category codebooks by formula (F3):

$$\rho_j(A, D_j) = \sqrt{\sum_{t=1}^{z} (a_t - b_t)^2} \quad \text{F3}$$

wherein $\rho_j(A, D_j)$ is the Euclidean distance from target optimized codebook A to j category codebook $D_j$, $a_t$ is t coding sequence feature in the target optimized codebook A, $b_t$ is t coding sequence feature in the category codebook $D_j$, $j \in [1, J]$, J is the number of the basic voiceprint feature sets;

wherein, the coding sequence features refer to the coefficients used to represent voiceprint features in each target optimized codebook, such as the linear cepstrum coefficients in step S252.

S53: selecting an Euclidean distance with the smallest numerical value from J Euclidean distances as the target Euclidean distance.

Specifically, step S52 shows that an Euclidean distance is obtained from the target optimized codebook to each category codebook. Understandably, the total number of Euclidean distances finally obtained is consistent with the total number of groups. These Euclidean distances are compared to obtain the Euclidean distance with the smallest value as the target Euclidean distance.

For example, in a specific embodiment, there are 10 groups, namely 10 basic voiceprint feature sets, and each basic voiceprint feature set corresponds to one category codebook. The Euclidean distance from the target optimized codebook to each category codebook is calculated respectively to obtain 10 Euclidean distances, and the Euclidean distance with the smallest value is selected from these Euclidean distances as the target Euclidean distance.

S54: acquiring the group to which the category codebook corresponding to the target Euclidean distance belongs, and taking the group as a current call-out group.

Specifically, it can be seen from step S32 that each category codebook corresponds to a group, and the group corresponding to the target Euclidean distance is obtained, and the group is taken as the current call-out group.

S55: according to the corresponding relation, determining the current calling authority corresponding to the current call-out group as the calling authority of the to-be-identified agent.

Specifically, according to the corresponding relationship between the call-out group and the calling authority determined in step S3, the calling authority corresponding to the current call-out group is obtained, and the authority is taken as the calling authority of the to-be-identified agent.

In the embodiment corresponding to FIG. 6, the target optimized codebook of the target voiceprint feature is obtained by preprocessing the target voiceprint feature, and then the Euclidean distance from the target optimized codebook to each category codebook is calculated, and the Euclidean distance with the smallest value is selected from all the Euclidean distances as the target Euclidean distance, then the group of the category codebook corresponding to the target Euclidean distance is obtained, and the group is taken as the current call-out group, and the current calling authority corresponding to the current call-out group is determined as the calling authority of the to-be-identified agent according to the corresponding relation between the group and the calling authority. So as to realize real-time and fast identification of the authority of the current out call, which is beneficial to realizing real-time monitoring and effectively improving the real-time performance of monitoring and the call quality of agent calls.

It should be understood that the sequence number of each step in the above embodiment does not indicate the order of implementation, and the implementation order of each step should be determined by its function and internal logic, and should not constitute any limitation on the implementation process of the embodiments of the present application.

Embodiment 2

Figure 7:
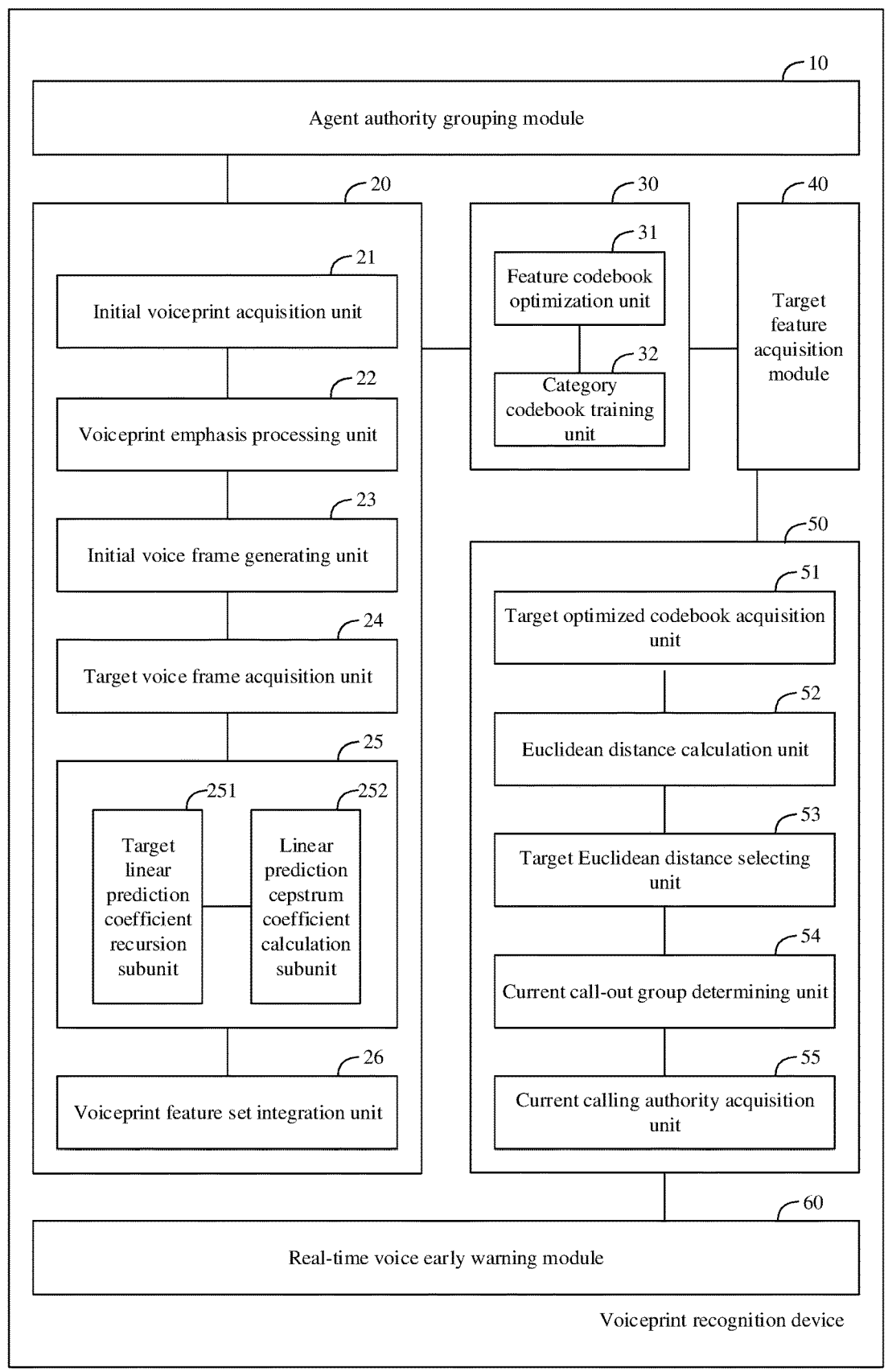
FIG. 7 is a schematic diagram of the voiceprint recognition device provided in embodiment 2 of the present application.

Refer to the voiceprint recognition method in embodiment 1, FIG. 7 shows a voiceprint recognition device corresponding to the voiceprint recognition method provided in embodiment 1. for convenience of explanation, only parts related to the embodiment of this application are shown.

As shown in FIG. 7, the voiceprint recognition device includes an agent authority grouping module 10, a voiceprint feature acquisition module 20, a recognition model building module 30, a target feature acquisition module 40, a calling authority determining module 50, and a real-time voice early warning module 60. Details of each functional module are as follows:

an agent authority grouping module 10, configured for acquiring calling authority of each agent form database, and allocating each agent into a group corresponding to their calling authorities according to a preset authority grouping mode;

a voiceprint feature acquisition module 20, configured for collecting voiceprint features of each agent in each group to obtain a basic voiceprint feature set of the group;

an identification model building module 30, configured for training the voiceprint features in each of the basic voiceprint feature sets to obtain integrated voiceprint features of each of the basic voiceprint feature sets, and building a dynamic voiceprint recognition model based on voiceprint correspondence relationships among the grouping, the calling authority and the integrated voiceprint features;

a target feature acquisition module 40, configured for acquiring customer level of a called customer and voice data of a to-be-identified agent if a call operation from the to-be-identified agent is detected, then and performing voiceprint feature extraction on the voice data to obtain target voiceprint features;

a calling authority determining module 50, configured for identifying the target voiceprint features and determining the calling authority of the to-be-identified agent based on the dynamic voiceprint recognition model;

a real-time voice early warning module 60, configured for executing a preset early warning processing measure if the calling authority of the to-be-identified agent does not meet required customer level.

Further, the voiceprint feature acquisition module 20 includes:

an initial voiceprint acquisition unit 21, configured for acquiring voice samples of each of the agents reading multiple different preset corpora, and performing voiceprint analysis on the voice samples to obtain initial voiceprint samples of the agents;

a voiceprint emphasis processing unit 22, configured for performing pre-emphasis on the initial voiceprint samples to generate emphasised voiceprint samples with flat frequency spectrums;

an initial voice frame generating unit 23, configured for framing the emphasised voiceprint samples to obtain initial voice frames using framing and windowing methods;

a target voice frame acquisition unit 24, configured for separating silent voice from the initial voice frames to obtain target voice frames;

a voiceprint feature extraction unit 25, configured for extracting voiceprint features based on the target voice frames;

a voiceprint feature set integration unit 26, configured for grouping the voiceprint features of each of the agents of the group into the basic voiceprint feature set of the group.

Preferably, the voiceprint feature extraction unit 25 includes:

a target linear prediction coefficient recursion subunit 251, configured for using Levinson-Durbin algorithm to predict linear prediction coefficient in calculation formula (F1) of prediction error of the target voice frame, and determining target linear prediction coefficients $a'_1, a'_2, \ldots, a'_p$ according to prediction results:

$$e(n) = s(n) - \hat{s}(n) = s(n) - \sum_{i=1}^{p} a_i s(n-i) \quad \text{F1}$$

wherein e(n) is the prediction error, ŝ(n) is a prediction value of a target voice frame sequence, n is the total number of points contained in the target voice frame sequence, s(n−i) is sum of the values of previous points n−i of the target voice frame sequence, $a_i$ is the linear prediction coefficient of the point i in the target voice frame sequence, p is preset order of linear prediction, i ∈[1, p], n is a positive integer;

a linear prediction cepstrum coefficient calculation subunit 252, configured for calculating a linear prediction cepstrum coefficient of the target voice frame by formula (F2) according to the target linear prediction coefficient, and taking the linear prediction cepstrum coefficient as the voiceprint feature:

$$\hat{h}(n) = \begin{cases} a'_1 & n = 1 \\ a'_n + \sum_{k=1}^{n-1}\left(1 - \frac{k}{n}\right)a'_k \hat{h}(n-k) & 1 < n \leq p \\ \sum_{k=1}^{p}\left(1 - \frac{k}{n}\right)a'_k \hat{h}(n-k) & n > p \end{cases} \quad \text{F2}$$

wherein ĥ(n) is the linear prediction cepstrum coefficient.

Further, the identification model building module 30 includes:

a feature codebook optimization unit 31, configured for adopting genetic algorithm to optimize the voiceprint features in the basic voiceprint feature set, to obtain a codebook set corresponding to the basic voiceprint feature set;

a category codebook training unit 32, configured for acquiring the total number q of codebooks in the codebook set corresponding to the basic voiceprint feature set for the xth basic voiceprint feature set, randomly selecting k codebooks in the codebook set as training samples, arithmetically averaging codebook matrix of the training samples according to corresponding bits to obtain category codebooks $D_x$, taking the category codebooks $D_x$ as the integrated voiceprint features of the basic voiceprint feature set of the xth group, wherein k∈[1, q], x and q are positive integers.

Further, the calling authority determination module 50 includes:

a target optimized codebook acquisition unit 51, configured for pre-processing the target voiceprint feature to obtain a target optimized codebook of the target voiceprint feature;

an Euclidean distance calculation unit 52, configured for calculating Euclidean distance from the target optimized codebook to each of the category codebooks by formula (F3):

$$\rho_j(A, D_j) = \sqrt{\sum_{t=1}^{z}(a_t - b_t)^2} \quad \text{F3}$$

wherein $\rho_j(A, D_j)$ is the Euclidean distance from target optimized codebook A to j category codebook $D_j$, $a_t$ is t coding sequence feature in the target optimized codebook A, $b_t$ is t coding sequence feature in the category codebook $D_j$, $j \in [1, J]$, J is the number of the basic voiceprint feature sets;

a target Euclidean distance selecting unit 53, configured for selecting an Euclidean distance with the smallest numerical value from Euclidean distances as the target Euclidean distance;

a current call-out group determining unit 54, configured for acquiring the group to which the category codebook corresponding to the target Euclidean distance belongs, and taking the group as a current call-out group;

a current calling authority acquisition unit 55, configured for determining the current calling authority corresponding to the current call-out group as the calling authority of the to-be-identified agent according to the corresponding relation.

The process for each module in the voiceprint recognition device provided by this embodiment to realize its respective functions can be specifically described with reference to the above-mentioned Embodiment 1, and will not be described here again.

Embodiment 3

This embodiment provides one or more non-volatile readable storage media storing computer readable instructions which, when executed by one or more processors, implement the voiceprint recognition method in Embodiment 1, or when executed by one or more processors, implement the functions of each module/unit in the voiceprint recognition device in Embodiment 2. In order to avoid repetition, it will not be repeated here.

It is understood that the nonvolatile readable storage medium may include any entity or device capable of carrying the computer readable instruction code, a recording medium, a U disk, a removable hard disk, a magnetic disk, an optical disk, a computer memory, a Read-Only Memory (ROM), a Random Access Memory (RAM), an electrical carrier signal, a telecommunication signal, and the like.

Embodiment 4

Figure 8:
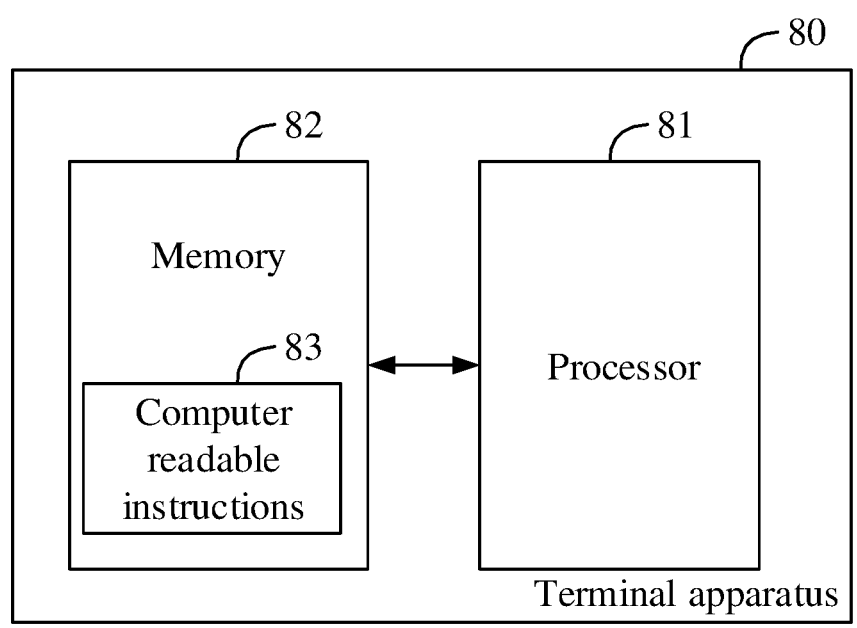
FIG. 8 is a schematic diagram of the voiceprint recognition terminal apparatus provided in embodiment 4 of the present application.

FIG. 8 is a schematic diagram of the terminal apparatus provided in an embodiment of the present application. As shown in FIG. 8, the terminal apparatus 80 of this embodiment includes a processor 81, a memory 82, and computer readable instructions 83 stored in the memory 82 and executable on the processor 81, such as a voiceprint recognition program. When the processor 81 executes the computer readable instructions 83, the steps in the above-described embodiments of the voiceprint recognition method are implemented, such as steps S1 to S6 shown in FIG. 1. Alternatively, the processor 81, when executing the computer readable instructions 83, realizes the functions of each module/unit in the above-mentioned device embodiments, such as the functions of the modules 10 to 60 shown in FIG. 7.

Exemplarily, computer readable instructions 83 may be divided into one or more modules/units, which are stored in memory 82 and executed by processor 81 to complete the present application. One or more modules/units may be instruction segments of a series of computer readable instructions capable of performing a specific function, which are used to describe the execution process of the computer readable instructions 83 in the terminal apparatus 80. For example, the computer readable instruction 83 can be divided into an agent authority grouping module module, a voiceprint feature acquisition module, a recognition model building module, a target feature acquisition module, a calling authority determining module and a real-time voice early warning module. The specific functions of each module are shown in Embodiment 2, and will not be repeated here to avoid repetition.

Those skilled in the art can clearly understand that, for convenience and conciseness of description, only the division of the above-mentioned functional units and modules will be illustrated. In actual application, the above-mentioned function distribution can be completed by different functional units and modules as required, i.e. the internal structure of the device is divided into different functional units or modules to complete all or parts of the above-mentioned functions. Further, the singular terms "a", "an" and "the" include plural reference and vice versa unless the context clearly indicates otherwise.

The above-mentioned embodiments are only used to illustrate the technical solution of the present application, and are not intended to limit it. Although the application has been described in detail with reference to the foregoing embodiments, those skilled in the art should understand, that the technical solution described in the previous embodiments can still be modified or some of its technical features can be equally replaced. However, these modifications or substitutions do not cause the nature of the corresponding technical solutions to depart from the spirit and scope of the technical solutions of the embodiments of this application, and should be included in the scope of protection of this application.

The invention claimed is:

1. A voiceprint recognition method, comprising:
    acquiring calling authority of each agent form database, and allocating each agent into a group corresponding to their calling authorities according to a preset authority grouping mode;
    collecting voiceprint features of each agent in each group to obtain a basic voiceprint feature set of the group;
    training the voiceprint features in each of the basic voiceprint feature sets to obtain integrated voiceprint features of each of the basic voiceprint feature sets, and building a dynamic voiceprint recognition model based on voiceprint correspondence relationships among the grouping, the calling authority and the integrated voiceprint features;
    acquiring customer level of a called customer and voice data of a to-be-identified agent if a call operation from the to-be-identified agent is detected, and performing voiceprint feature extraction on the voice data to obtain target voiceprint features;
    identifying the target voiceprint features and determining the calling authority of the to-be-identified agent based on the dynamic voiceprint recognition model;
    executing a preset early warning processing measure if the calling authority of the to-be-identified agent does not meet required customer level.

2. The voiceprint recognition method of claim 1, wherein the step of collecting voiceprint features of each agent in each group to obtain a basic voiceprint feature set of the group comprises:
    acquiring voice samples of each of the agents reading multiple different preset corpora, and performing voiceprint analysis on the voice samples to obtain initial voiceprint samples of the agents;

performing pre-emphasis on the initial voiceprint samples to generate emphasised voiceprint samples with flat frequency spectrums;

framing the emphasised voiceprint samples to obtain initial voice frames using framing and windowing methods;

separating silent voice from the initial voice frames to obtain target voice frames;

extracting voiceprint features based on the target voice frames;

in each of the groups, grouping the voiceprint features of each of the agents of the group into the basic voiceprint feature set of the group.

3. The voiceprint recognition method of claim 2, wherein the step of extracting voiceprint features based on the target voice frames comprises:

using Levinson-Durbin algorithm to predict linear prediction coefficient in calculation formula (F1) of prediction error of the target voice frame, and determining target linear prediction coefficients $a'_1, a'_2, \ldots, a'_p$ according to prediction results:

$$e(n) = s(n) - \hat{s}(n) = s(n) - \sum_{i=1}^{p} a_i s(n-i) \quad \text{F1}$$

wherein $e(n)$ is the prediction error, $\hat{s}(n)$ is a prediction value of a target voice frame sequence, n is the total number of points contained in the target voice frame sequence, $s(n-i)$ is sum of the values of previous points $n-i$ of the target voice frame sequence, $a_i$ is the linear prediction coefficient of the point i in the target voice frame sequence, p is preset order of linear prediction, $i \in [1, p]$, n is a positive integer;

calculating a linear prediction cepstrum coefficient of the target voice frame by formula (F2) according to the target linear prediction coefficient, and taking the linear prediction cepstrum coefficient as the voiceprint feature:

$$\hat{h}(n) = \begin{cases} a'_1 & n = 1 \\ a'_n + \sum_{k=1}^{n-1}\left(1 - \frac{k}{n}\right) a'_k \hat{h}(n-k) & 1 < n \le p \\ \sum_{k=1}^{p}\left(1 - \frac{k}{n}\right) a'_k \hat{h}(n-k) & n > p \end{cases} \quad \text{F2}$$

Wherein $\hat{h}(n)$ is the linear prediction cepstrum coefficient.

4. The voiceprint recognition method of claim 1, wherein the step of training the voiceprint features in each of the basic voiceprint feature sets to obtain integrated voiceprint features of each of the basic voiceprint feature sets, comprises:

for each basic voiceprint feature set, adopting genetic algorithm to optimize the voiceprint features in the basic voiceprint feature set, to obtain a codebook set corresponding to the basic voiceprint feature set;

for the xth basic voiceprint feature set, acquiring the total number q of codebooks in the codebook set corresponding to the basic voiceprint feature set, randomly selecting k codebooks in the codebook set as training samples, arithmetically averaging codebook matrix of the training samples according to corresponding bits to obtain category codebooks $D_x$, taking the category codebooks $D_x$ as the integrated voiceprint features of basic voiceprint feature set of the xth group, wherein $k \in [1, q]$, x and q are positive integers.

5. The voiceprint recognition method of claim 4, wherein the step of based on the dynamic voiceprint recognition model, identifying the target voiceprint features and determining the calling authority of the to-be-identified agent, comprises:

pre-processing the target voiceprint feature to obtain a target optimized codebook of the target voiceprint feature;

calculating Euclidean distance from the target optimized codebook to each of the category codebooks by formula (F3):

$$\rho_j(A, D_j) = \sqrt{\sum_{t=1}^{z}(a_t - b_t)^2} \quad \text{F3}$$

wherein $\rho_j(A, D_j)$ is the Euclidean distance from target optimized codebook A to j category codebook $D_j$, $a_t$ is t coding sequence feature in the target optimized codebook A, $b_t$ is t coding sequence feature in the category codebook $D_j$, $j \in [1, J]$, J is the number of the basic voiceprint feature sets;

selecting an Euclidean distance with the smallest numerical value from J Euclidean distances as the target Euclidean distance;

acquiring the group to which the category codebook corresponding to the target Euclidean distance belongs, and taking the group as a current call-out group;

according to the corresponding relation, determining the current calling authority corresponding to the current call-out group as the calling authority of the to-be-identified agent.

6. A terminal apparatus, comprising a memory, a processor, and computer readable instructions stored in the memory and executed by the processor, wherein the processor performs the following steps when executing the computer readable instructions:

acquiring calling authority of each agent form database, and allocating each agent into a group corresponding to their calling authorities according to a preset authority grouping mode;

collecting voiceprint features of each agent in each group to obtain a basic voiceprint feature set of the group;

training the voiceprint features in each of the basic voiceprint feature sets to obtain integrated voiceprint features of each of the basic voiceprint feature sets, and building a dynamic voiceprint recognition model based on voiceprint correspondence relationships among the grouping, the calling authority and the integrated voiceprint features;

acquiring customer level of a called customer and voice data of a to-be-identified agent if a call operation from the to-be-identified agent is detected, and performing voiceprint feature extraction on the voice data to obtain target voiceprint features;

identifying the target voiceprint features and determining the calling authority of the to-be-identified agent based on the dynamic voiceprint recognition model;

executing a preset early warning processing measure if the calling authority of the to-be-identified agent does not meet required customer level.

7. The terminal apparatus of claim 6, wherein the step of collecting voiceprint features of each agent in each group to obtain a basic voiceprint feature set of the group comprises:

acquiring voice samples of each of the agents reading multiple different preset corpora, and performing voiceprint analysis on the voice samples to obtain initial voiceprint samples of the agents;

performing pre-emphasis on the initial voiceprint samples to generate emphasised voiceprint samples with flat frequency spectrums;

framing the emphasised voiceprint samples to obtain initial voice frames using framing and windowing methods;

separating silent voice from the initial voice frames to obtain target voice frames;

extracting voiceprint features based on the target voice frames;

in each of the groups, grouping the voiceprint features of each of the agents of the group into the basic voiceprint feature set of the group.

8. The terminal apparatus of claim 7, characterized in that using Levinson-Durbin algorithm to predict linear prediction coefficient in calculation formula (F1) of prediction error of the target voice frame, and determining target linear prediction coefficients $a'_1, a'_2, \ldots, a'_p$ according to prediction results:

$$e(n) = s(n) - \hat{s}(n) = s(n) - \sum_{i=1}^{p} a_i s(n-i) \quad \text{F1}$$

wherein e(n) is the prediction error, $\hat{s}(n)$ is a prediction value of a target voice frame sequence, n is the total number of points contained in the target voice frame sequence, s(n−i) is sum of the values of previous points n−i of the target voice frame sequence, $a_i$ is the linear prediction coefficient of the point i in the target voice frame sequence, p is preset order of linear prediction, $i \in [1, p]$, n is a positive integer;

calculating a linear prediction cepstrum coefficient of the target voice frame by formula (F2) according to the target linear prediction coefficient, and taking the linear prediction cepstrum coefficient as the voiceprint feature:

$$\hat{h}(n) = \begin{cases} a'_1 & n=1 \\ a'_n + \sum_{k=1}^{n-1}\left(1-\frac{k}{n}\right)a'_k \hat{h}(n-k) & 1 < n \le p \\ \sum_{k=1}^{p}\left(1-\frac{k}{n}\right)a'_k \hat{h}(n-k) & n > p \end{cases} \quad \text{F2}$$

wherein $\hat{h}(n)$ is the linear prediction cepstrum coefficient.

9. The terminal apparatus of claim 6, wherein the step of training the voiceprint features in each of the basic voiceprint feature sets to obtain integrated voiceprint features of each of the basic voiceprint feature sets, comprises:

for each basic voiceprint feature set, adopting genetic algorithm to optimize the voiceprint features in the basic voiceprint feature set, to obtain a codebook set corresponding to the basic voiceprint feature set;

for the xth basic voiceprint feature set, acquiring the total number q of codebooks in the codebook set corresponding to the basic voiceprint feature set, randomly selecting k codebooks in the codebook set as training samples, arithmetically averaging codebook matrix of the training samples according to corresponding bits to obtain category codebooks $D_x$, taking the category codebooks $D_x$ as the integrated voiceprint features of basic voiceprint feature set of the xth group, wherein $k \in [1, q]$, x and q are positive integers.

10. The terminal apparatus of claim 9, wherein the step of identifying the target voiceprint features and determining the calling authority of the to-be-identified agent based on the dynamic voiceprint recognition model, comprises:

pre-processing the target voiceprint feature to obtain a target optimized codebook of the target voiceprint feature;

calculating Euclidean distance from the target optimized codebook to each of the category codebooks by formula (F3):

$$\rho_j(A, D_j) = \sqrt{\sum_{t=1}^{z}(a_t - b_t)^2} \quad \text{F3}$$

wherein $\rho_j(A, D_j)$ is the Euclidean distance from target optimized codebook A to j category codebook $D_j$, $a_t$ is t coding sequence feature in the target optimized codebook A, $b_t$ is t coding sequence feature in the category codebook $D_j$, $j \in [1, J]$, J is the number of the basic voiceprint feature sets;

selecting an Euclidean distance with the smallest numerical value from J Euclidean distances as the target Euclidean distance;

acquiring the group to which the category codebook corresponding to the target Euclidean distance belongs, and taking the group as a current call-out group;

according to the corresponding relation, determining the current calling authority corresponding to the current call-out group as the calling authority of the to-be-identified agent.

11. One or more non-transitory readable storage medium storing computer readable instructions, wherein when the computer readable instructions are executed by one or more processors, the one or more processors perform the following steps:

acquiring calling authority of each agent form database, and allocating each agent into a group corresponding to their calling authorities according to a preset authority grouping mode;

collecting voiceprint features of each agent in each group to obtain a basic voiceprint feature set of the group;

training the voiceprint features in each of the basic voiceprint feature sets to obtain integrated voiceprint features of each of the basic voiceprint feature sets, and building a dynamic voiceprint recognition model based on voiceprint correspondence relationships among the grouping, the calling authority and the integrated voiceprint features;

acquiring customer level of a called customer and voice data of a to-be-identified agent if a call operation from the to-be-identified agent is detected, and performing voiceprint feature extraction on the voice data to obtain target voiceprint features;

identifying the target voiceprint features and determining the calling authority of the to-be-identified agent based on the dynamic voiceprint recognition model;

executing a preset early warning processing measure if the calling authority of the to-be-identified agent does not meet required customer level.

12. The non-transitory readable storage medium of claim 11, wherein the step of collecting voiceprint features of each agent in each group to obtain a basic voiceprint feature set of the group comprises:

acquiring voice samples of each of the agents reading multiple different preset corpora, and performing voiceprint analysis on the voice samples to obtain initial voiceprint samples of the agents;

performing pre-emphasis on the initial voiceprint samples to generate emphasised voiceprint samples with flat frequency spectrums;

framing the emphasised voiceprint samples to obtain initial voice frames using framing and windowing methods;

separating silent voice from the initial voice frames to obtain target voice frames;

extracting voiceprint features based on the target voice frames;

in each of the groups, grouping the voiceprint features of each of the agents of the group into the basic voiceprint feature set of the group.

13. The non-transitory readable storage medium of claim 12, wherein the step of extracting voiceprint features based on the target voice frames comprises:

using Levinson-Durbin algorithm to predict linear prediction coefficient in calculation formula (F1) of prediction error of the target voice frame, and determining target linear prediction coefficients $a'_1, a'_2, \ldots, a'_p$ according to prediction results:

$$e(n) = s(n) - \hat{s}(n) = s(n) - \sum_{i=1}^{p} a_i s(n-i) \quad \text{F1}$$

wherein e(n) is the prediction error, ŝ(n) is a prediction value of a target voice frame sequence, n is the total number of points contained in the target voice frame sequence, s(n−i) is sum of the values of previous points n−i of the target voice frame sequence, $a_i$ is the linear prediction coefficient of the point i in the target voice frame sequence, p is preset order of linear prediction, i∈[1, p], n is a positive integer;

calculating a linear prediction cepstrum coefficient of the target voice frame by formula (F2) according to the target linear prediction coefficient, and taking the linear prediction cepstrum coefficient as the voiceprint feature:

$$\hat{h}(n) = \begin{cases} a'_1 & n = 1 \\ a'_n + \sum_{k=1}^{n-1}\left(1 - \frac{k}{n}\right) a'_k \hat{h}(n-k) & 1 < n \leq p \\ \sum_{k=1}^{p}\left(1 - \frac{k}{n}\right) a'_k \hat{h}(n-k) & n > p \end{cases} \quad \text{F2}$$

wherein ĥ(n) is the linear prediction cepstrum coefficient.

14. The non-transitory readable storage medium of claim 11, wherein the step of training the voiceprint features in each of the basic voiceprint feature sets to obtain integrated voiceprint features of each of the basic voiceprint feature sets, comprises:

for each basic voiceprint feature set, adopting genetic algorithm to optimize the voiceprint features in the basic voiceprint feature set, to obtain a codebook set corresponding to the basic voiceprint feature set;

for the xth basic voiceprint feature set, acquiring the total number q of codebooks in the codebook set corresponding to the basic voiceprint feature set, randomly selecting k codebooks in the codebook set as training samples, arithmetically averaging codebook matrix of the training samples according to corresponding bits to obtain category codebooks $D_x$, taking the category codebooks $D_x$ as the integrated voiceprint features of the basic voiceprint feature set of the xth group, wherein k∈[1, q], x and q are positive integers.

15. The non-transitory readable storage medium of claim 14, wherein the step of identifying the target voiceprint features and determining the calling authority of the to-be-identified agent based on the dynamic voiceprint recognition model, comprises:

pre-processing the target voiceprint feature to obtain a target optimized codebook of the target voiceprint feature;

calculating Euclidean distance from the target optimized codebook to each of the category codebooks by formula (F3):

$$\rho_j(A, D_j) = \sqrt{\sum_{t=1}^{z} (a_t - b_t)^2} \quad \text{F3}$$

wherein $\rho_j(A, D_j)$ is the Euclidean distance from target optimized codebook A to j category codebook $D_j$, $a_t$ is t coding sequence feature in the target optimized codebook A, $b_t$ is t coding sequence feature in the category codebook $D_j$, j∈[1, J], J is the number of the basic voiceprint feature sets;

selecting an Euclidean distance with the smallest numerical value from J Euclidean distances as the target Euclidean distance;

acquiring the group to which the category codebook corresponding to the target Euclidean distance belongs, and taking the group as a current call-out group;

according to the corresponding relation, determining the current calling authority corresponding to the current call-out group as the calling authority of the to-be-identified agent.

* * * * *